United States Patent [19]

Straub et al.

[11] Patent Number: 5,022,702
[45] Date of Patent: Jun. 11, 1991

[54] REDUCED HEIGHT UPPER RAIL FOR CURTAINSIDE TRUCK TRAILERS

[76] Inventors: Martin L. Straub, 13131 Island Lake Rd., Dexter, Mich. 48130; James D. Davis, Rte. 2, Box 535, Minden, La. 71055

[21] Appl. No.: 562,125

[22] Filed: Aug. 3, 1990

[51] Int. Cl.⁵ ............................................. B60J 5/06
[52] U.S. Cl. .................................. 296/181; 160/84.1; 296/183
[58] Field of Search ............... 296/181, 183; 160/84.1, 160/118

[56] References Cited

U.S. PATENT DOCUMENTS

| | | | |
|---|---|---|---|
| 3,709,552 | 1/1973 | Broadbent | 296/183 |
| 4,545,611 | 10/1985 | Broadbent | 296/183 |
| 4,795,208 | 1/1989 | Whiteman | 296/181 |
| 4,828,316 | 5/1984 | Bennett et al. | 296/181 |
| 4,943,110 | 7/1990 | Pastva | 296/181 |

*Primary Examiner*—Robert R. Song
*Attorney, Agent, or Firm*—James M. Deimen

[57] ABSTRACT

An upper rail for large curtainside truck-trailers comprises a double vertical web structure joined at the top by a horizontal plate that extends beyond the outer web to the outside of the trailer roof anad beyond the inner web for increased support of the roof sheets. Simultaneous with providing the trolley way for the curtainside trolleys, the double vertical web provides the necessary stiffness and load carrying capacity within a 3 inch depth, top to bottom, rail for a 48 foot truck trailer.

14 Claims, 1 Drawing Sheet

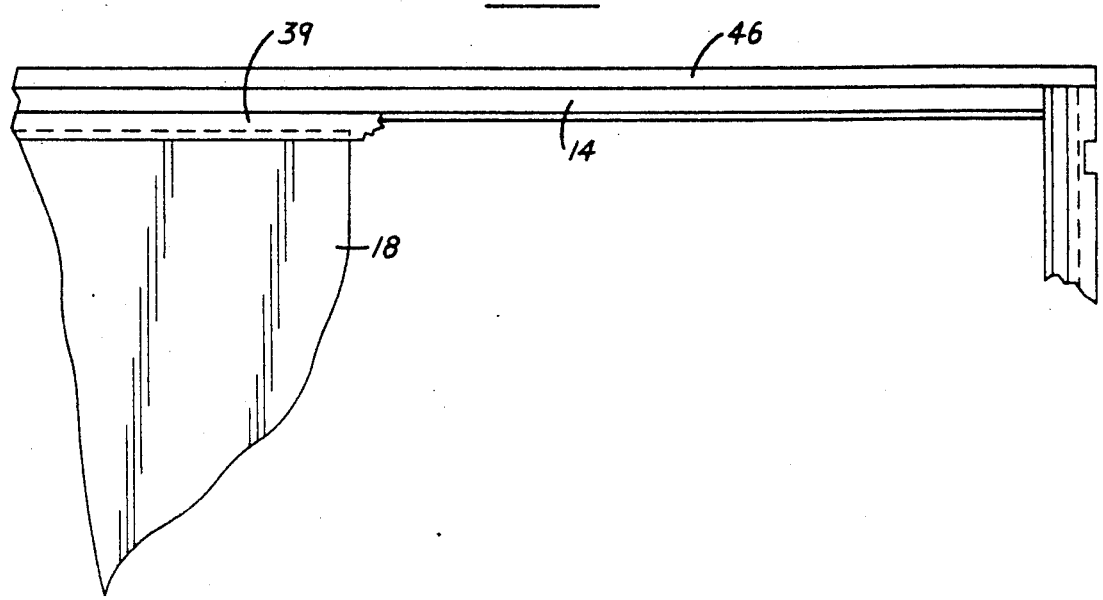
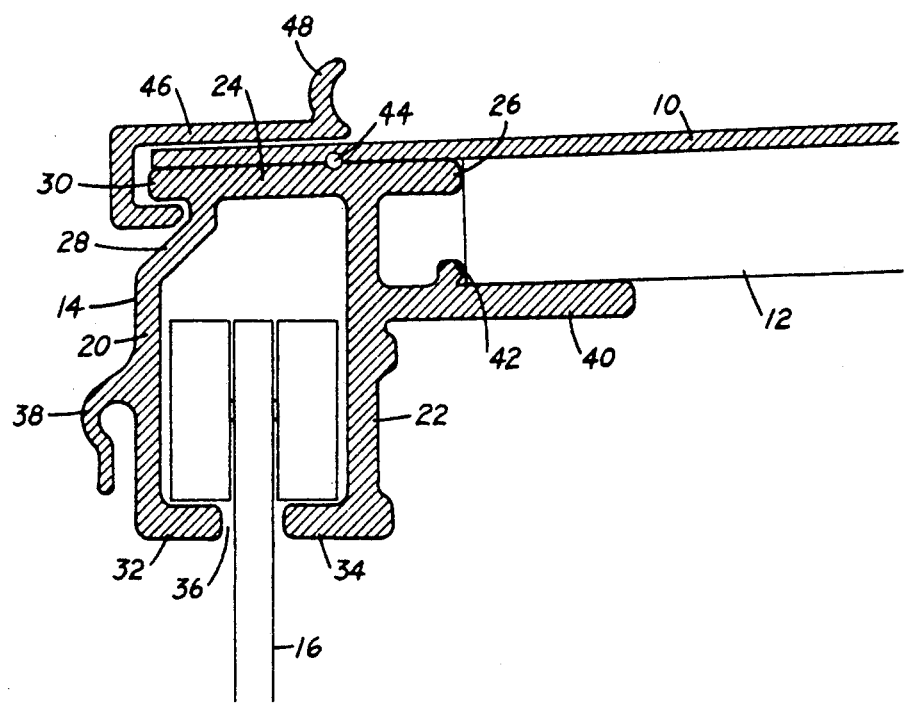

REDUCED HEIGHT UPPER RAIL FOR CURTAINSIDE TRUCK TRAILERS

BACKGROUND OF THE INVENTION

The field of the invention pertains to large truck-trailers, in particular, to truck trailers having movable curtainsides wherein the entire sides of the trailer are of flexible material that can be drawn back to one end of the trailer to expose the entire cargo. Such trailers can be loaded much more quickly than trailers with rear doors. In some automotive related installations, the loading and unloading docks are equipped with fully automated loading and unloading equipment for curtainside trailers. An example of a curtainside trailer is disclosed in U.S. Pat. No. 4,828,316.

The roof of the truck trailer is supported by an upper rail on each side of the trailer. The upper rail extends the length of the trailer usually without support except at the ends of the trailer. In some trailers there may be removable or permanent intermediate supports for the rail. The upper rail also supports the curtain forming the curtainside and some additional vertical stress from the plurality of tie down straps that retain the curtain vertically taught.

The upper rail is commonly formed of an extruded structural aluminum, such as 6061-T6. The extruded shape provides a trolley-way for the curtain trolleys and a shelf or ledge to support roof bows. Grooves and flanges may also be provided for sealing gaskets and clip on gutters. The maximum allowable height of the truck trailer limits the height of the top of the upper rail measured from street level. The lower edge or bottom of the upper rail limits the vertical opening measured from the truck trailer bed or floor. Because of the dead weight, live weight, wind and snow loading and the vibration and torquing of the trailer in use, the upper rails are typically 5 inches or more in vertical depth for the standard curtainside 48 foot trailer. Any decrease in upper rail height results in an equal increase in vertical opening of the trailer and is a desirable goal, in particular, for truck trailers applied to automated loading and unloading systems. Applicants and their associates have previously developed 5 inch depth upper rails, however, further reduction in depth is a desirable goal. Nevertheless, despite the reduction in depth, the load carrying capacity and the limitations on maximum deflection must be met. With these generally conflicting requirements in view, applicants have invented the new upper rail disclosed below.

SUMMARY OF THE INVENTION

The new upper rail comprises a double vertical web structure joined at the top by a horizontal plate that extends beyond the outer web to the outside of the roof and extends beyond the inner web for increased support of the roof sheets. The inner web supports an inwardly extending shelf or ledge for the support of the roof bows and the outer web is formed with a valance receiver for the movable curtain. The double vertical webs form the trolley-way sides and turned under flanges support the trolley wheels for the curtain trolleys. The dual vertical web upper rail permits a 3 inch vertical depth and a substantial reduction in weight per foot of rail without a sacrifice in load carrying capacity or deflection.

DESCRIPTION OF THE DRAWINGS

FIG. 1 illustrates a cutaway portion of the roof and upper rail in side view; and FIG. 2 is a cross-section of the new upper rail, a portion of the roof and a trolley in engagement with the upper rail.

DESCRIPTION OF THE PREFERRED EMBODIMENTS

Illustrated in FIGS. 1 and 2 are two cutaway views of a curtainside truck-trailer roof comprising roof sheeting 10 supported on roof bows 12 extending across the width of the truck-trailer. Supporting the roof bows 12 and roof sheeting 10 along the length of each side of the truck trailer is an upper rail 14. The upper rail 14 supports a plurality of trolleys 16 which in turn support the foldable curtain 18 on each side of the truck-trailer.

The upper rail 14 is formed of extruded structural aluminum with the cross-section shown in FIG. 2. A suitable structural aluminum is the 6061-T6 designation. The upper rail 14 comprises two vertical outer and inner webs 20 and 22 spaced apart and joined by a top plate 24. The top plate 24 extends inwardly beyond the inner web 22 as indicated by the inner edge at 26. The outer web 20 upper portion is biased inward at 28 with the top plate 24 extending outwardly beyond the outer web 20 as indicated at 30.

At the bottom of the outer 20 and inner 22 vertical webs are a pair of flanges 32 and 34 separated by a gap 36. The flanges 32 and 34 form a trolley way for the plurality of curtain trolleys 16 which roll therethrough. On the outside of the web 20 is formed a valance receiver 38 for a longitudinal dust seal gasket 39 that engages the curtain 18. The dust seal gasket 39 prevents water, dust and smoke from entering the trailer through the trolley assemblies that support the curtain 18.

Extending from the inner web 22 is a shelf 40 to support the roof bows 12 that extend across the trailer periodically along the length of the trailer. Extending upwardly along the shelf 40 is a small flange 42 that is in line vertically with the inner edge 26 of the top plate 24. The flange 42 and inner edge 26 form stops for the roof bows 12.

Over the roof bows 12 and top plate 24 is fastened the roof sheeting 10. A small bead of sealant 44 is placed in a shallow trough formed in the top plate 24 as shown to provide a dust and water seal between the roof sheeting 10 and the upper rail 14. Bolts or other fasteners may be used periodically along the upper rail 14 to fasten the roof sheeting 10 tightly to the rail top plate 24. An extruded gutter and trim piece or clip 46 fits over the edge 30 of the top plate 24 and has an upstanding flange portion 48 forming a gutter that directs water to the ends of the trailer rather than allow the water to flow over the curtainsides of the trailer. The gutter clip 46 also fastens the roof sheeting 10 tightly to the top plate 24. The gutter clip 46 has been shown slightly spaced from the roof sheeting 10 and edge 30 for clarity only. Bolts or fasteners may also be used periodically along the gutter clip 46 to fasten the clip 46 and sheeting 10 tightly to the upper rail top plate 24. The top plate 24 may also include a slight slope (about 1°30″) in keeping with the pitch of the roof sheeting 10 and roof bows 12.

As an example a three inch height rail as disclosed above and shown in the drawing has the following characteristics:

Center of mass from the lower most rail surface and outside:

Horizontal $Xc = 1.851''$

Vertical $Yc = 1.646''$

Moment of Inertia About Principal Axis Through Center of Mass:

Horizontal $Ixc = 2.621$ inches$^4$

Vertical $Iyc = 3.963$ inches$^4$

Radius of Gyration:

Horizontal $Rxc = 0.931$ inches$^4$

Vertical $Ryc = 1.105$ inches$^4$

We claim:

1. A curtainside truck-trailer three inch upper rail comprising in cross-section a substantially horizontal top plate, a pair of spaced apart inner and outer substantially vertical webs depending from the top plate, the upper portion of the outer web having an intermediate part thereof biased inwardly and the top plate extending outwardly beyond the juncture with the outer web, a pair of substantially horizontal flanges each extending from one web and toward the other web to form a gap therebetween at the bottom of the rail whereby a trolley may be supported for longitudinal motion within the rail, the combination of the top plate, bottom flanges and pair of webs having a substantially rectangular cross-section for substantially the full height of the rail, and means extending inwardly from the inner web to support truck-trailer roof bows.

2. The curtainside truck-trailer three inch upper rail of claim 1 including a valance channel on the outside vertical web.

3. The curtainside truck-trailer three inch upper rail of claim 1 wherein the means to support the roof bows comprises a shelf having an upwardly extending protrusion adapted to engage the ends of the roof bows.

4. The curtainside truck-trailer three inch upper rail of claim 1 wherein the top plate extends inwardly beyond the juncture with the inner vertical web.

5. The curtainside truck-trailer three inch upper rail of claim 1 wherein the upper rail comprises an aluminum extrusion.

6. The curtainside truck-trailer three inch upper rail of claim 1 wherein the upper surface of the top plate has a slight slope downwardly toward the outside edge of the top plate.

7. The curtainside truck-trailer three inch upper rail of claim 1 wherein the horizontal moment of inertia through the center of mass is about 2 to 3 in inches to the fourth power.

8. A curtainside truck-trailer upper rail and roof assembly comprising in cross-section a three inch upper rail having a top plate, a pair of spaced apart inner and outer substantially vertical webs depending from the top plate, the upper portion of the outer web having an intermediate part thereof biased inwardly and the top plate extending outwardly beyond the juncture with the outer web, a pair of substantially horizontal flanges each extending from one web and toward the other web to form a gap therebetween at the bottom of the rail, the combination of the top plate, bottom flanges and pair of webs having a substantially rectangular cross-section for substantially the full height of the rail, the top plate extending inwardly beyond the juncture with the inner web, and a shelf extending inwardly from the inner web, and further comprising a plurality of roof bows in supported engagement with the shelf, said roof bows spaced apart and perpendicular to the upper rail along the length of the upper rail, roof sheeting supported on the bows and the top plate, and a gutter clip, said gutter clip in cross-section including a U-shaped outward edge in tight engagement with the outward extension of the top plate and an upstanding flange on the inner edge of the gutter clip to form a gutter, said gutter clip extending over a portion of the sheeting to engage the sheeting to the top plate and further extending along at least a substantial portion of the upper rail.

9. The curtainside truck-trailer upper rail and roof assembly of claim 8 wherein the shelf includes an upstanding protrusion to engage the ends of the roof bows.

10. The curtainside truck-trailer upper rail and roof assembly of claim 8 wherein the upper surface of the top plate has a slight slope downward toward the outside edge of the top plate.

11. The curtainside truck-trailer upper rail and roof assembly of claim 8 wherein the upper rail comprises an aluminum extrusion.

12. The curtainside truck-trailer upper rail and roof assembly of claim 8 wherein the upper rail and gutter clip both comprise aluminum extrusions.

13. The curtainside truck-trailer upper rail and roof assembly of claim 8 wherein the horizontal moment of inertia through the center of mass of the upper rail is about 2 to 3 in inches to the fourth power.

14. A curtainside truck-trailer three inch upper rail comprising in cross-section a substantially horizontal top plate, a pair of spaced apart inner and outer substantially vertical webs depending from the top plate, means extending from the vertical webs to form a trolleyway, and means extending from the inner web to support roof bows wherein the horizontal moment of inertia through the center of mass of the upper rail is about 2 to 3 in inches to the fourth power.

* * * * *